United States Patent [19]

Bredal

[11] Patent Number: 4,610,589
[45] Date of Patent: Sep. 9, 1986

[54] SCREW ANCHORING BUSHING FOR USE IN SEMIHARD MATERIALS

[75] Inventor: Torben Bredal, Odense, Denmark

[73] Assignee: Tri-Bolt Fasteners ApS, Denmark

[21] Appl. No.: 621,465

[22] Filed: Jun. 18, 1984

Related U.S. Application Data

[63] Continuation of Ser. No. 315,868, Oct. 28, 1981, which is a continuation of Ser. No. 943,934, Sep. 20, 1978, abandoned.

[30] Foreign Application Priority Data

Sep. 20, 1977 [GB] United Kingdom ............... 39049/77

[51] Int. Cl.$^4$ ............................................. F16B 37/04
[52] U.S. Cl. ..................................... 411/180; 411/61; 411/74; 411/508
[58] Field of Search ..................... 411/60, 61, 57, 74, 411/71, 73, 72, 177, 179, 180, 183, 463, 466, 520, 521, 528, 529, 107, 395, 508–510

[56] References Cited

U.S. PATENT DOCUMENTS

| | | | |
|---|---|---|---|
| 942,693 | 12/1909 | Wintermute | 411/74 |
| 985,762 | 2/1911 | Ogden | 411/73 |
| 1,049,376 | 1/1913 | Le Manquais | 411/15 |
| 1,095,366 | 5/1914 | Abbott | 411/71 |
| 1,372,035 | 3/1921 | Ogden | 411/61 |
| 1,373,645 | 4/1921 | Bandoly | 411/74 |
| 1,410,258 | 3/1922 | Kennedy | 411/61 |
| 1,470,858 | 10/1923 | Maxwell | 411/74 |
| 2,032,017 | 2/1936 | Hocher et al. | 411/395 |
| 2,582,580 | 1/1952 | Bedford, Jr. | 411/520 |
| 2,596,952 | 5/1952 | Crowther | 411/61 |
| 2,938,405 | 5/1960 | West | 411/61 |
| 3,217,586 | 11/1965 | Jaworski | 411/60 |
| 3,250,170 | 5/1966 | Siegel | 411/61 |
| 3,335,632 | 8/1967 | Fischer | 411/31 |
| 3,709,089 | 1/1973 | Seetaram | 411/74 |

FOREIGN PATENT DOCUMENTS

| | | | |
|---|---|---|---|
| 1444248 | 5/1966 | France | 411/177 |
| 393489 | 12/1973 | U.S.S.R. | 411/178 |

Primary Examiner—Gary L. Smith
Assistant Examiner—Neill Wilson
Attorney, Agent, or Firm—Sixbey, Friedman & Leedom

[57] ABSTRACT

A screw anchoring plug or bushing for use in predrilled mounting holes in elements of semihard materials such as chipboard, consisting of a sleeve made as a rolled up piece of metal sheet material provided with a number of slightly projecting barb-like tongue portions and cured to be resilient, whereby the tongue portions project as leaf springs. The sleeve is threaded for direct engagement with a standard screw, and when it is inserted in the mounting hole and the ends of the tongue portions are hereby caused to resiliently engage the wall of the hole, the sleeve will thereafter be moved axially outwardly when the screw is tightened, and the tongues will cut themselves into the hole wall and get spread to resist further retraction of the sleeve.

5 Claims, 8 Drawing Figures

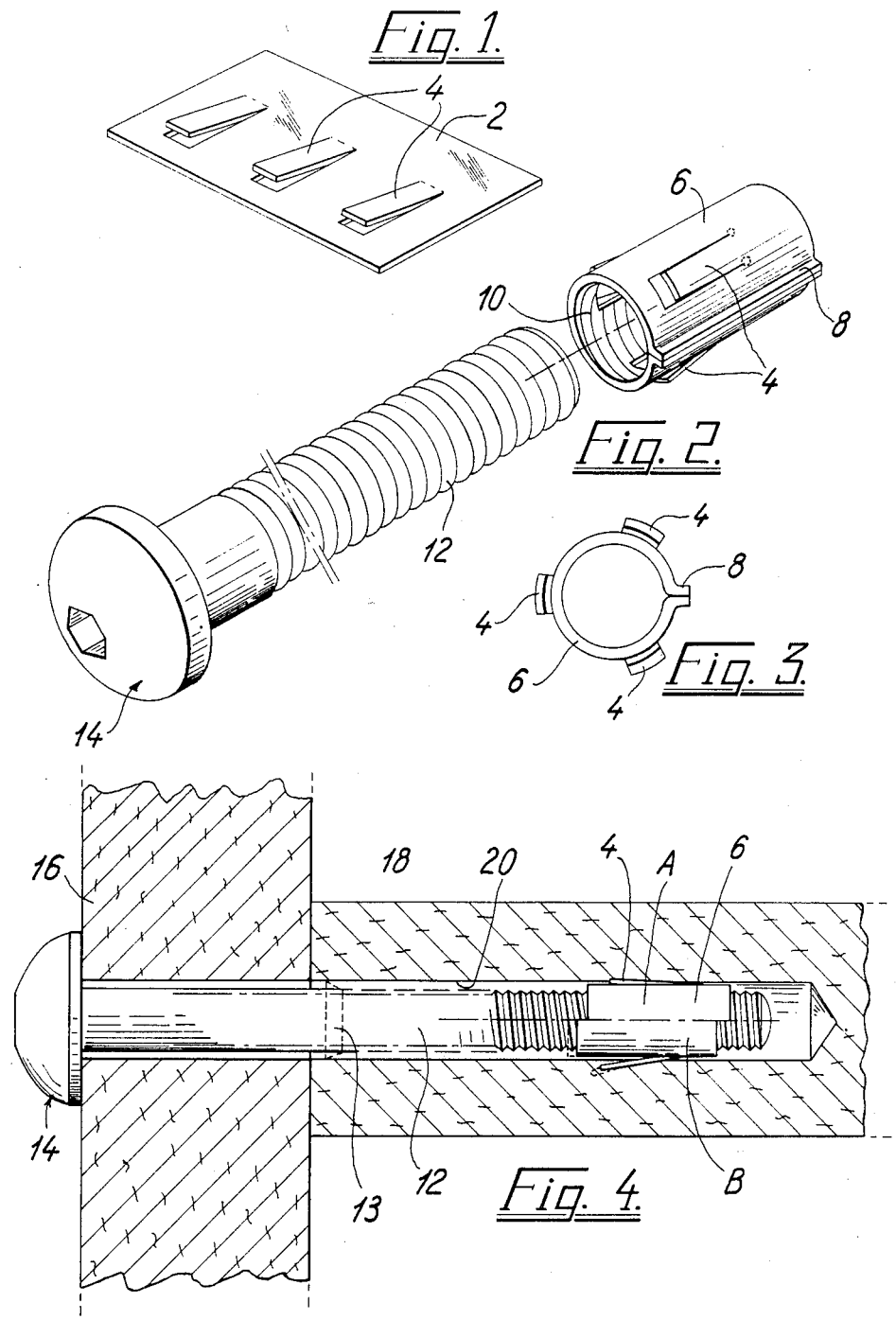

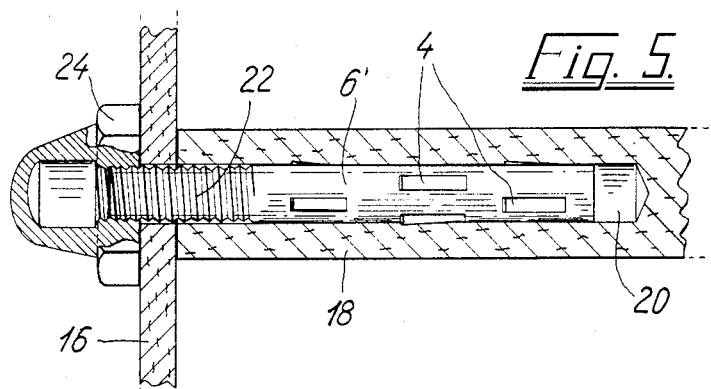
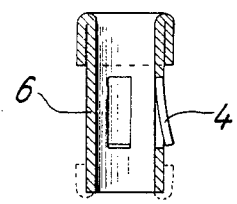
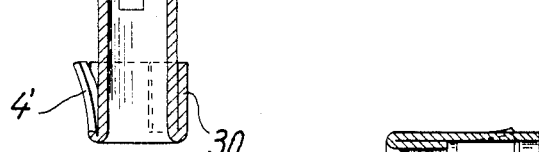
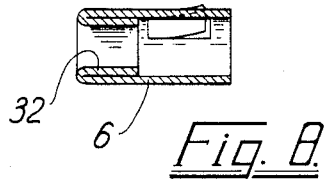

SCREW ANCHORING BUSHING FOR USE IN SEMIHARD MATERIALS

This is a continuation of application Ser. No. 315,868, filed Oct. 28, 1981, which in turn is a continuation of application Ser. No. 943,934, filed Sept. 20, 1978, now abandoned.

The present invention relates to fastening means for anchoring a screw or bolt in a hole in a workpiece of a semihard material such as a chipboard plate element. As far as rigid or hard materials are concerned, e.g. stone, metal, tiles or concrete, it is easy to provide for a safe and stable anchoring of a screw in a predrilled hole therein with the use of any of a variety of known expansion plugs; the wall of the hole is able to resist a very hard radial pressure as exerted by the plug as a result of the screw being screwed into the plug, and once a firm anchoring has been established it is liable to be durable, too, when the plug is of a reasonably good quality, with small tendency to compression shrinkage. However, a similar good anchoring will not be achieved when the material is semihard only, because the hole wall will yield not only radially, but even axially by its frictional engagement with the outside of the expansion plug, when the screw is subjected to pulling forces resulting e.g. from a hard tightening of the screw. Not even a very pronounced expansion of the plug will solve the problem, because this might cause real damage to the material.

Various attempts have been made to provide for special plugs for the use in question, whereby barb-like protrusions are caused to be swung outwardly from the plug, more or less cutting their way through the workpiece material in response to the screw or bolt being tightened, whereby they are generally spread so as to provide for axial holding of the plug without generally causing expansion of the material adjacent the mounting hole. The known plugs or fasteners, however, show certain drawbacks which have limited the practical use thereof, because the plugs have been either unreliable or expensive, e.g. in requiring specially adapted cooperating parts.

Thus, more specifically the invention relates to a screw anchoring plug or bushing of the type specified in the introductory clause of claim 1, and it is the purpose of the invention to provide such a bushing which is simple in construction and reliable in use.

The bushing according to the invention is characterized by the improvements whereby it is constituted by a sleeve member rolled up from a metallic sheet material and having barbs which by their own resiliency will engage the wall of the mounting hole such that they will automatically cut into the wall and get spread when the screw is tightened, no special means being required for provoking the spreading of the barbs. The sleeve is screw cut for direct engagement with the screw, and for a complete fixture it is sufficient to use one unitary and simple sleeve member and one ordinary screw. The barbs may be caused to be spread widely without breaking, and they will offer a very high resistance against retraction of the sleeve.

The invention is described in more detail in the following with reference to the accompanying drawing, in which:

FIG. 1 is a perspective view of a prepared blank for the production of a holding sleeve according to the invention, FIG. 2 is a perspective exploded view of the sleeve and an associated bolt, FIG. 3 is an end view of the sleeve, FIG. 4 is a sectional view of a plate element joint showing the sleeve in two different positions, FIG. 5 is a side elevation of a modified embodiment of the sleeve, and FIGS. 6-8 are sectional views illustrating further modifications.

The blank 2 shown in FIG. 1 is a strip of a rigid sheet material in which is provided, by punching, three tongues 4 which are bent out slightly to one side of the blank. This blank is rolled together so as to form a sleeve 6 as shown in FIGS. 2 and 3, the opposite or now adjacent free edges of the blank being bent outwardly to present an axial rib portion 8. These edges are not necessarily joined or fixed to each other. The sheet strip is rolled such that the tongues 4 now constitute outwardly projecting barb-like protrusions. While the sleeve 6 is supported in its rolled together condition it is provided with a through-going internal threading 10 which may alternatively be provided by some thread rolling operation on the flat blank 2, prior to the rolling together thereof. The sleeve 6 and the threading 10 (irrespectively of how being produced in detail) is made so as to fit as a nut member on the screw threaded shaft 12 of a bolt 14. In a preferred embodiment the sleeve 6 is produced in a suitable metal sheet and cured in such a manner that the tongues or barbs 4 project as relatively hard leaf springs from a spring steel material.

In use the sleeve 6 is screwed onto the outer end of the bolt shaft 12 (FIGS. 2 and 4), and the construction elements 16 and 18 to be joined (FIG. 4) are prepared by the drilling of a hole 20 having a diameter corresponding to the exterior diameter of the cylindrical body portion of the sleeve 6, or only slightly larger than that. Then the bolt shaft 12 is put into this hole until the bolt head abuts the element 16, whereby the sleeve 6 is located e.g. in position A of FIG. 4. It may be necessary to force the bolt into the hole 20, because the rib portion 8 has to cut a groove in the hole wall; on the other hand, once the bolt is introduced the rib portion 8 will thereafter prevent the sleeve 6 from idle rotation inside the hole when the bolt is thereafter rotated.

By the introduction of the sleeve 6 into the hole 20 the tongues or barbs 4 will be resiliently forced into positions almost flush with the surrounding sleeve material, as shown in position A of FIG. 4, the sleeve of course being mounted with the free barb ends facing the head of the bolt. When the bolt is thereafter screwed home the sleeve 6 will act as a nonrotatable nut and be axially displaced as shown by position B. Hereby, as the free ends of the barbs 4 are biased against the wall of the hole 20, these barb ends will cut themselves into the wall material and cause the barbs in the first instance to reassume their initial positions and thereafter—if the bolt is screwed further—to get forced outwardly by their own cutting action to an oppositely biased position outside said initial position, i.e. anyway the barbs will be spread out from the sleeve when the bolt is tightened, without generally exerting any substantial expansion effect on the hole wall. However, by the spreading out of the barbs these will present a substantial resistance against further axial displacement of the sleeve, as this will result in a material compression between the inside of the respective barb 4 and the outside of the sleeve 6. Therefore when the barbs are strong enough to transfer this resistance to the sleeve, the bolt may be screwed home in tight manner already by a few turns.

It will be appreciated that it will always be possible to after-tighten the bolt, as the sleeve may in fact be displaced along the entire shaft of the bolt, without restriction as caused by expansion shoulder means on the bolt or a closed outer sleeve end portion as principally known from prior proposals. Accordingly, the sleeve 6 may be used in connection with any standard bolt 14, though of course it may be preferable to make use of a bolt, the top shaft portion of which is thick enough to fill out the hole 20 adjacent the plane of division between the two elements 16 and 18. Alternatively, a separate, simple sleeve member may be used, if desired, to fill out the hole at this place for locking the parts against displacement crosswise to the bolt 14.

The tightening force on the sleeve 6 will to some degree be converted into a force tending to open the sleeve, but such opening force is easily taken up by the rib portion 8, as the opposed edge portions thereof are locked together in the said self-cut groove in the hole wall. The force might even be taken up already by a snug fit of the sleeve 6 in the hole 20 without giving rise to substantial expansion forces.

The sleeve 6 may be longer than shown in FIGS. 1-4 and may be provided with barbs spaced not only circumferentially, but also axially.

The sleeve may even be long enough to constitute its own bolt shaft, as shown in FIG. 5, where the long sleeve 6' is provided with several barbs 4 and having one end portion externally screw threaded or -rolled as shown at 22 and being received by a tightening nut 24 preferably of the bolt end covering type.

Before the blank 2 of FIG. 1 is rolled together to form a sleeve one or both opposed longitudinal edge portions thereof (i.e. those to be rolled) may be folded to provide increased strength of the sleeve and to facilitate thread cutting, internal or external, without weakening the sleeve. A cross sectional view of a sleeve prepared in this manner is shown in FIG. 6. FIG. 7 shows an embodiment featuring both external screw threading of the folded edge portion 26 for cooperation with a nut 28 made of a pressed sheet blank and—independent thereof—the use of an outwardly folded edge portion 30 as the material portion in which the tongues 4' are provided. In this case, of course, the tongues are prepared by cutting from the free edge of the blank 2.

In FIG. 8 is shown an embodiment in which the innermost end of the sleeve is provided with an inwardly folded edge portion 32, the interior side of which may be threaded for cooperation with a usual bolt shaft.

What I claim is:

1. In a screw anchoring bushing of the type for use in elements of a semihard material such as chipboard, consisting of a substantially cylindrical metal sleeve body for insertion in a predrilled mounting hole in said element and threaded for cooperation with a tightening screw member, said sleeve body being provided with axially extending tongue portions operable to be swung outwardly in a barb-like manner in response to tightening of said screw member so as to intrude into the wall of the mounting hole and thereby obstruct retraction of the sleeve body, the improvement wherein the sleeve body is a threaded metal sheet member of pronounced material resiliency rolled through substantially 360° so as to bring opposite edges thereof into a mutually adjacent position, said tongue portions being provided as barbs bent outwardly from the sleeve body so as to be resiliently depressable inwardly towards the cylindric surface of the sleeve body, and wherein said edges are provided with axially extending outwardly bent edge strip portions which are operable to self-cut an axial receiving groove in the surface of said hole during insertion of said sleeve body into said hole so as to thereafter form a means for restricting both rotation of said sleeve body and opening expansion of said sheet member, whereby anchoring of said sleeve body is achieved essentially through spreading of said tongue portions during axial displacement of said sleeve body during tightening of said screw member.

2. An anchoring bushing according to claim 1, wherein said edge strip portions have outer parallelly disposed oppositely facing surfaces for engaging walls of said receiving groove to prevent said rotation and opening expansion.

3. An anchoring bushing for use in elements of a semihard material such as chipboard, consisting of a substantially cylindrical metal sleeve body for insertion in a predrilled mounting hole in said element and threaded for cooperation with a tightening screw member, said sleeve body being provided with axially extending tongue portions operable to be swung outwardly in a barb-like manner in response to tightening of said screw member so as to intrude into the wall of the mounting hole and thereby obstruct retraction of the sleeve body, said tongue portions having free ends directed toward a front end of the sleeve body that is outermost located in use, characterized in that the sleeve body is made as a rolled up and threaded metal sheet member of pronounced material resiliency, said tongue portions being provided as barbs bent outwardly from the sleeve body so as to be resiliently depressable inwardly towards the cylinder surfaces of the sleeve body, and in that the tightening screw member is in the shape of a threaded nut and the rolled up sheet member is provided with an exterior threading adjacent said front end, for cooperation with said nut shaped tightening screw member.

4. An anchoring bushing for use in elements of a semihard material such as chipboard. consisting of a substantially cylindrical metal sleeve body for insertion in a predrilled mounting hole in said element and threaded for cooperation with a tightening screw member, said sleeve body being provided with axially extending tongue portions extending from the body toward a first front end thereof, that is outermost located in use, and operable to be swung outwardly in a barblike manner in response to tightening of said screw member so as to intrude into the wall of the mounting hole and thereby obstruct retraction of the sleeve body, characterized in that the sleeve body is made as a rolled up and threaded metal sheet member of pronounced material resiliency, said tongue portions being provided as barbs bent outwardly from the sleeve body so as to be resiliently depressable inwardly towards the cylindric surface of the sleeve body, and in that at least some of the said tongue or barb portions are provided between axial incisions in an exterior folded edge portion of a second rear end of the sleeve body, which is innermost located in use.

5. A screw anchoring assembly for use in predrilled holes in construction elements of a semihard material, comprising a mounting screw, having a threaded operative stem portion, and a generally cylindrical anchoring bushing, said anchoring bushing being internally threaded for effective screwing cooperation with said mounting screw stem portion and consisting of a sheet of rigid spring metal rolled into a sleeve member, said sleeve member having integrally formed therein a number of barb-like tongues which are bent outwardly from the sleeve member so as to be resiliently depressable inwardly towards a cylindrical outer surface of the sleeve member as well as being outwardly pivotable away therefrom, and said sleeve member being rolled up such that longitudinally extending edge portions thereof abut each other so as to thereby define an operative diameter of the bushing that is coordinated to that of the threading of the screw stem portion for ensuring a free and nonexpansive screwability of the screw along the internal threading of the bushing, at least one of the abutting edge portions being provided with an outwardly projecting rib portion.

* * * * *